(No Model.)  6 Sheets—Sheet 1.

F. H. RICHARDS.
WEIGHING MACHINE.

No. 570,299.  Patented Oct. 27, 1896.

Fig. 1.

Witnesses
R. W. Pittman
Fred. J. Dole.

Inventor
F. H. Richards.

THE NORRIS PETERS CO., PHOTO-LITHO., WASHINGTON, D. C.

(No Model.)  6 Sheets—Sheet 2.

F. H. RICHARDS.
WEIGHING MACHINE.

No. 570,299. Patented Oct. 27, 1896.

*Fig. 2.*

Witnesses:
R. W. Pittman
Fred. J. Dole.

Inventor:
F. H. Richards.

(No Model.)

F. H. RICHARDS.
WEIGHING MACHINE.

No. 570,299.  Patented Oct. 27, 1896.

Witnesses:
R. W. Pittman
Fred. J. Dole.

Inventor:
F. H. Richards.

(No Model.)  6 Sheets—Sheet 4.

F. H. RICHARDS.
WEIGHING MACHINE.

No. 570,299.  Patented Oct. 27, 1896.

Fig. 5.

Witnesses  
R. W. Pitman  
Fred. J. Dole.

Inventor  
F. H. Richards.

(No Model.) 6 Sheets—Sheet 5.
F. H. RICHARDS.
WEIGHING MACHINE.

No. 570,299. Patented Oct. 27, 1896.

Witnesses
R. W. Pittman
Fred. J. Dole.

Inventor:
F. H. Richards.

(No Model.)
6 Sheets—Sheet 6.

F. H. RICHARDS.
WEIGHING MACHINE.

No. 570,299. Patented Oct. 27, 1896.

Witnesses:
R. W. Pittman
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 570,299, dated October 27, 1896.

Application filed June 23, 1896. Serial No. 596,590. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved automatically-operating machine of this character, the principal parts and bearings of which are inclosed or housed, whereby unauthorized tampering or interference therewith is positively prevented, said parts being also protected from the deleterious action of foreign matter, which usually works into said bearings and clogs the same, by virtue of which organization the machine is particularly adapted for weighing certain classes of substances, such as chemicals and finely pulverulent materials.

In the drawings accompanying and forming part of this specification.

Similar characters designate like parts in all the figures of the drawings.

The principal operative parts of the machine will be suitably incased or housed, so that they will be protected from the action of certain classes of substances, whereby the ingress of dust, dirt, and other foreign matter to the bearings of said parts, as well as access thereto or tampering by unauthorized persons, is prevented. For this purpose the chambered supporting-base 3 is utilized as a dust-proof casing, said casing being approximately U-shaped in horizontal section. The base 3 preferably has removable plates, the end plates 4 and 4' and the top plate 5 being thus constructed so that access may be had to the interior or chamber of the base for any purpose, said removable plates being held in place by suitable fastening means. The opposite members of the top plate 5 are shown having formed thereon the side frames or columns 2 and 2', connected at the top by the plate or beam 6, with which the chute or hopper H may be formed integral.

The bucket or load-carrying receptacle of the machine is designated by G, and in the form herein illustrated is of the "single-chambered" type or class, said bucket being supported by suitable mechanism with its receiving-opening beneath the supply-outlet of the chute or hopper H, from which latter a stream of material may flow into said bucket.

For controlling the supply stream from the chute or hopper H a valve substantially similar in construction and mode of operation to the improved valve disclosed in Letters Patent No. 535,727, granted to me March 12, 1895, is herein illustrated. Said valve is designated by 7 and has a swinging movement beneath the supply-outlet of the chute or hopper H, being pivoted for oscillatory movement between the brackets or arms 6', depending from the top plate 6.

For supporting the bucket the beam mechanism illustrated may be employed, one of the constituent parts of which is the counterweighted scale-beam B, supported for movement within the chamber of the base 3 so that its respective bearings may be thereby protected. The scale-beam B comprises a pair of complementary arms joined by the combined counterweight and connecting-shaft W. Said beam-arms are similarly supported within the base 3, and the means illustrated for sustaining the bucket from and by said beam-arms being the same in each case, it is deemed necessary to describe in detail but one of the beam-arms and its connections, similar parts being designated by corresponding reference-characters with prime marks.

A bearing for the beam-arm 9 is shown at 10, it being of well-known shape and suitably connected and supported within the chamber of the base 3 and sustaining the knife-edge 12, extending from said beam-arm 9.

One of a pair of supplemental beams is shown at 13 mounted within one of the branches of the base 3, the companion supplemental beam being similarly mounted in the other branch. A support for said supplemental beam is shown at 14 as a bearing located within the chamber of the base, said beam 13 having a knife-edge 15 resting on said bearing. The supplemental beams (only one of which is illustrated) will be preferably supported for movement in unison with the beam B, the link 16 being illustrated connecting the beam-arm 9 and the supplemental beam 13, it being understood that the other supplemental beam (not illustrated) may be likewise connected to the opposite arm of the beam B.

A bucket-supporting frame or yoke is shown at 17, and in shape approximately coincides with that of the supporting-base 3, and said frame 17 has depending therefrom at suitable intervals V-shaped or other bearings, as 18 and 19, which work against or are sustained by pivots or knife-edges, as 20 and 21, connected to the beam mechanism.

A pair of risers or hangers are shown at 22 and 23, respectively, each of which terminates in a transverse portion suitably attached to the opposite branches of the bucket-frame 17, said risers also passing through openings or apertures formed in the top plate 5 of the base. The connection of the bucket with the supporting-risers 22 and 23 will preferably be a laterally-yielding one, so that the bucket is free to sway or rock within limits during the weighing operation without causing a grinding of the various bearings against each other.

A pair of flanged brackets are shown at 25 and 26 projecting endwise from the bucket G, through the flanges of which suitable holding means may be passed and into the bucket, so that said brackets may be held in place. The brackets 25 and 26 are shown terminating in furcations, between the branches or members of which the ends of the risers 22 and 23 may be hung for oscillating movement, suitable pivots, as 27 and 28, journaled in said branches and passing through openings formed in said ends constituting convenient means for connecting said hangers and brackets.

For preventing the ingress of substances through the riser-openings in the top plate 5 of the base a dust-guard of any preferred form is employed, and a yielding dust-guard is shown, it being in the form of an extensible bellows-like device connected, respectively, to said risers and the top plate 5. The guards being the same in each case, it is necessary to specifically describe but one of them in detail, corresponding parts in the other being designated by similar characters with prime marks. A circular flange is shown at 29 formed on the upper face of the top plate 5 and extending about the riser-opening 30, said flange being embraced by the annulus 31, to which may be suitably connected the bellows 32, of pliable leather or textile or other suitable material, the upper end of said bellows being likewise attached to the flanged collar 33, which is longitudinally movable along the riser 22, a suitable set-screw 34, passing through the flange of said collar and binding against the riser 22, being preferably employed for maintaining the collar 33 in an adjusted position relative to said riser. By reason of such organization it will be evident that the bucket is adapted to have free vertical and lateral movements relative to its support, the extensible dust-guard, to which allusion has been made, permitting such action, though preventing the ingress of dust, &c., to the interior of the base.

Figure 1:
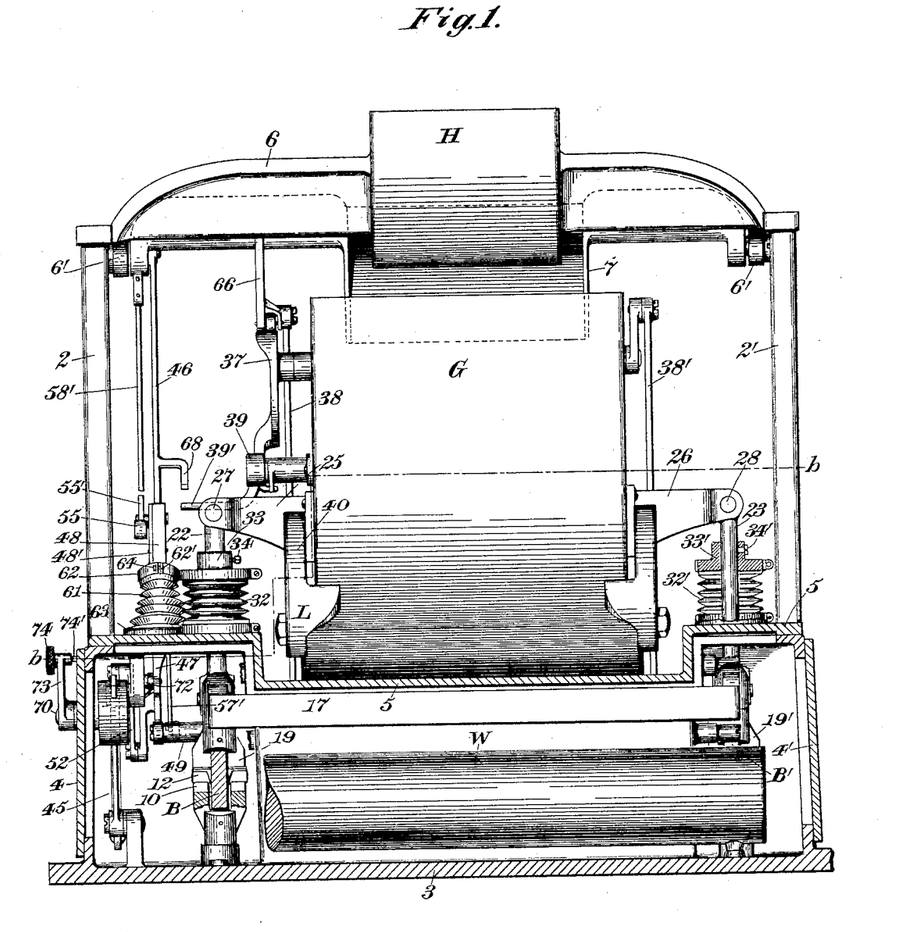
Figure 1 is a front elevation of a weighing-machine comprehending my present improvements in the preferred embodiment thereof, the supporting-base being in vertical section, taken in line $a\ a$, Fig. 3.
Figure 2:
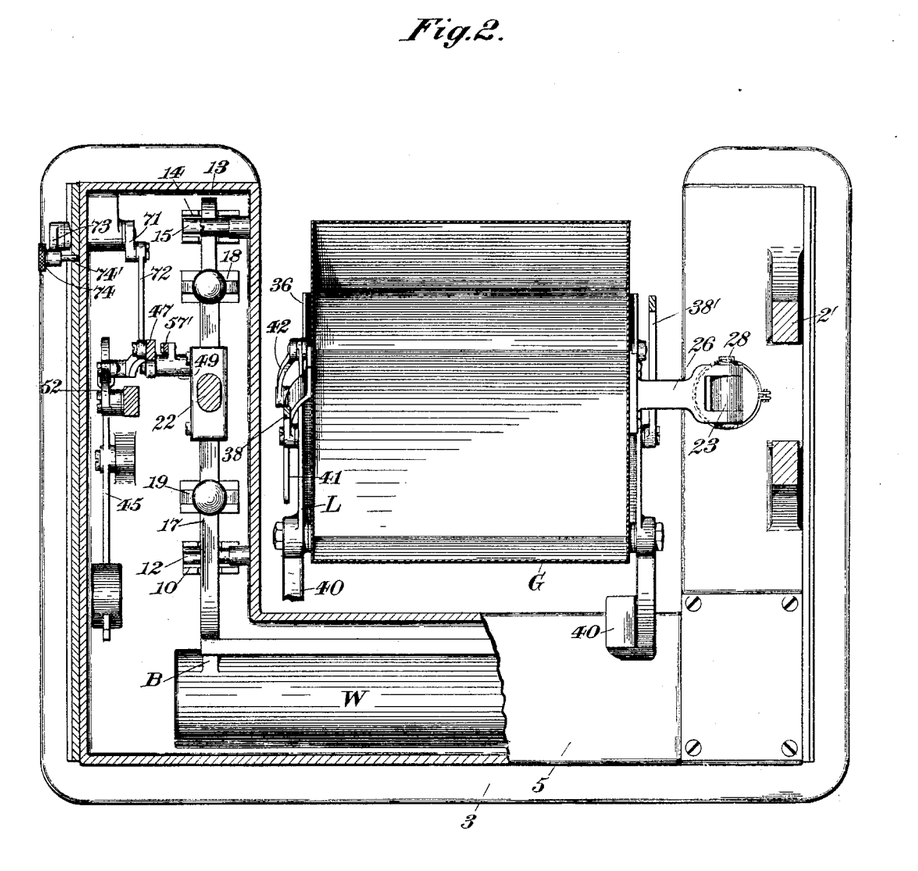
Fig. 2 is a sectional plan view of the machine, the section being taken in line $b\ b$, Fig. 1.
Figures 3, 4:
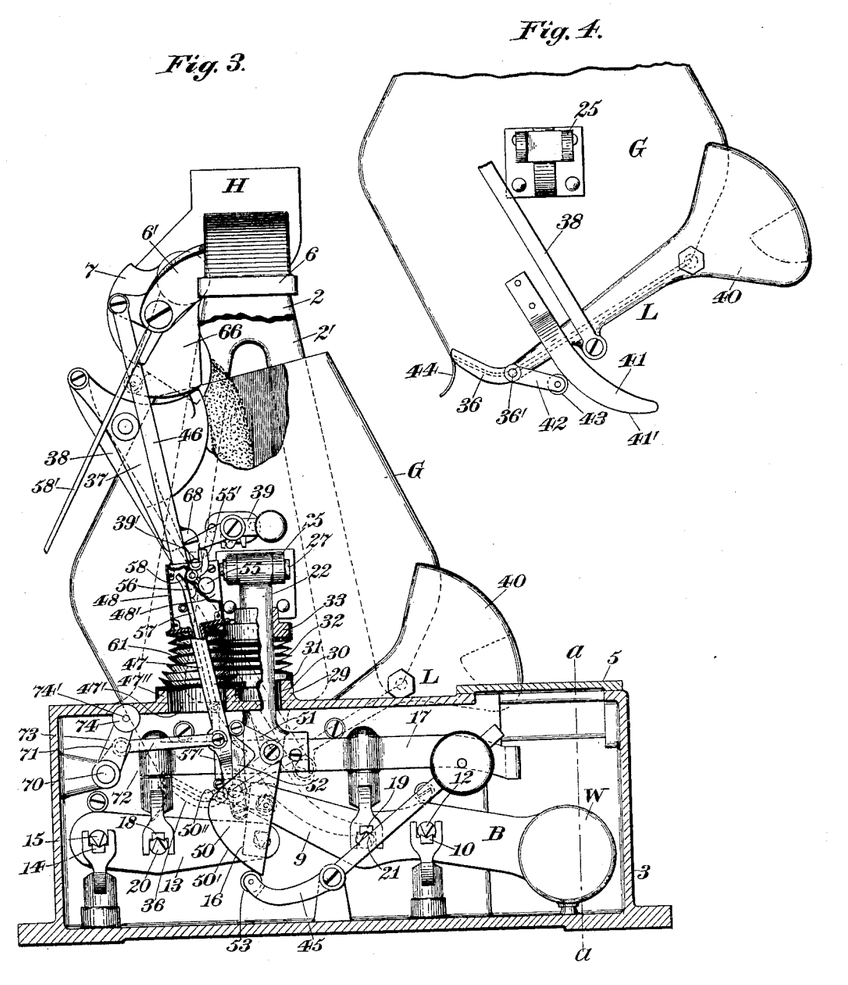
Fig. 3 is an end elevation as seen from the left in Fig. 1, the mechanism being in position corresponding therewith and the base being in vertical longitudinal section.
Fig. 4 is a left-hand end elevation of a fragment of the bucket, the closer, and certain adjacent parts thereto, said closer being illustrated in its normal or shut position.
Figures 6, 7:
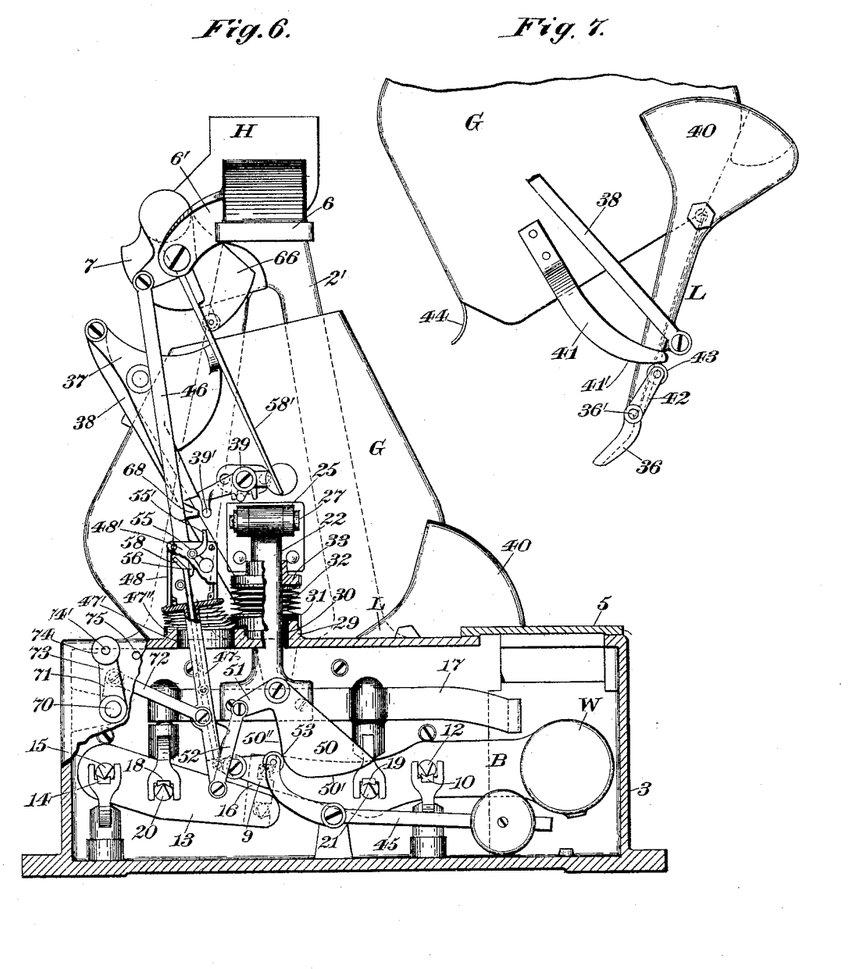
Fig. 7 is a view similar to Fig. 4, the closer being in its full open position.

The closer for the bucket is designated by L, and constitutes a shiftable load-discharge member, (see Figs. 4 and 7,) and preferably consists of a flat plate nearly covering the discharge-opening of the bucket when in its normal or shut position, as indicated in Fig. 4, said closer being preferably pivoted at one side of the discharge-outlet of the bucket and set at an inclination when in its normal position, so that it may be opened with facility when released at the proper point in the operation of the machine.

A supplemental closer or flap is illustrated at 36, it being preferably pivoted at the discharge edge or lip of the main closer L, and shutting the opening intervening between said main closer L and the rear wall of the bucket G, as indicated in Fig. 4.

For supporting the closer L an inverted toggle is herein illustrated consisting of the rocker 37, pivotally supported near the upper rearward side of the bucket G, and the relatively long rod 38, pivotally connected with said rocker and with the closer in such a manner that when the latter is in its normal position the three toggle-pivots will be located approximately in alinement, so that said rocker when engaged by a suitable detent device may be held against rocking movement by a minimum pressure. For thus preventing the oscillation of the rocker 37, and hence the opening movement of the closer L, a latch 39 is herein shown, said latch being counterweighted and pivotally supported on the bucket G adjacent to said rocker, the latch in the embodiment illustrated swinging upward to engage the rocker 37. It will be evident that on the depression of said latch at the proper point in the operation of the machine the closer L will be freed of all restraint, and may be instantly forced open by the weight of the bucket contents, so that the same may be discharged between the two branches of the base 3.

For returning the closer L to its normal position it may be equipped with counterweighted end plates, as 40, preferably formed integral therewith.

For actuating the supplemental closer a depending cam rigidly attached to the bucket is illustrated at 41. The projecting pivot or trunnion 36' of the supplemental closer 36 is shown having fixed thereto the crank-arm 42, which carries adjacent to the free end thereof the antifriction-roll 43, located to travel along the working face 41' of the cam 41, said face being of such a formation as will permit the forcing of the supplemental closer 36 into alinement with the main closer L on the opening of the latter and by the weight of the mass discharged by the bucket. On the return or shutting movement of the main closer L the working face 41' of the cam 41, as the roll 43 travels therealong, acts to shut the supplemental closer 36. When the latter has nearly reached its normal position, it is adapted to engage the curved guard-plate 44, depending from the bucket G, so that when the parts are in their normal positions a perfectly tight joint will be provided. As the closer L returns to its normal position, the supplemental closer 36, which is in the nature of a regulator, is adapted take a firm hold in the bucket-discharged mass, so that said movement will be retarded or impeded and ample time allowed for the complete discharge of the bucket load.

In connection with a valve and with a rod connected thereto a pair of actuators will be employed, each being operative for transmitting a thrust to said rod. The actuators alternate in action, and the scale-beam B constitutes one of said actuators, it serving in the form herein illustrated as a convenient means for transmitting an opening thrust to the valve 7, the counterweighted lever 45, pivotally supported within the base 3, and hereinafter more particularly described, serving as a device for imparting a closing movement to said valve. A relatively long rod is shown at 46, it being preferably pivotally connected with the valve 7 at a point to the rear of the axis of movement of said valve and passing through an opening 47' in the base 3, said rod constituting a medium for transmitting the thrusts of said actuators to the valve for alternately opening and closing the same. The rod 46 consists of two parts, the lower section 47 being preferably tubular, for a purpose hereinafter set forth, said parts being connected by the casing 48, which may be formed in one piece with the rod 46.

Figures 8, 9, 10, 11, 12:
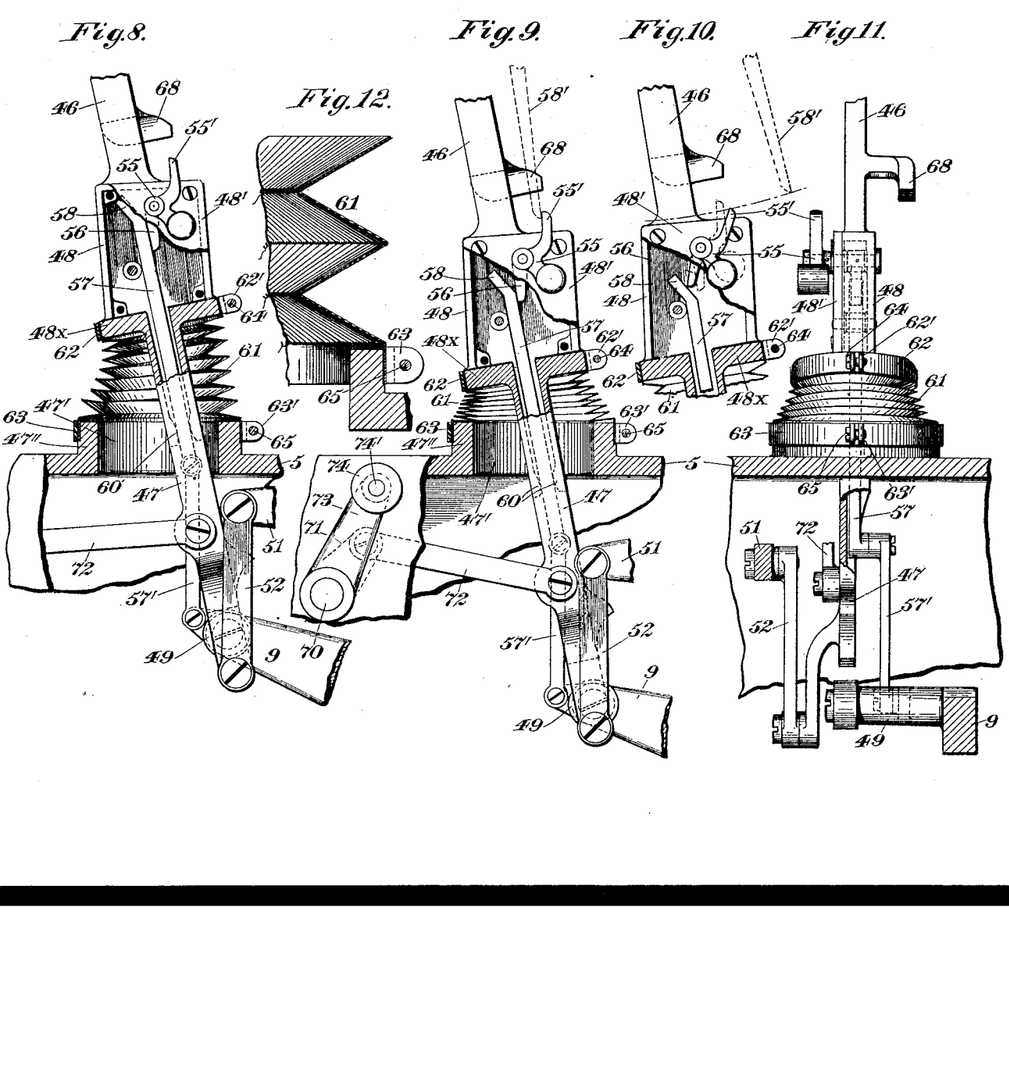
Figs. 8 to 12, inclusive, are detail views on an enlarged scale, and hereinafter more particularly described.

The beam-arm 9 at a point adjacent to the non-counterweighted end thereof is provided with a lateral projection 49, carrying at its outer end an antifriction-roll, against which the lower end of the tubular section of the rod 46 is adapted to abut normally, as indicated in Figs. 3 and 8. As the scale-beam descends, it is evident that the beam-arm 9 will fall from under the rod 46, so that the valve-closing actuator 45 is effective for transmitting its thrust to the valve 7, whereby the volume of the supply stream from the chute or hopper H may be gradually reduced and said stream subsequently cut off thereby. As the scale-beam B returns to its normal position, the beam-arm 9 being in engagement with the free end of the rod 46, it will be apparent that an upward thrust will be transmitted to said rod 46 by said beam, and in turn communicated to the valve 7 for forcing the same open.

A valve-closing cam is shown at 50 suitably suspended within the chamber of the base 3 and having the angular extension 51 operatively connected by means of the link 52 with the lower end of the rod 46, the working face of said cam 50 being in position to receive a force exerted by the counterweighted lever 45 for effecting a closing movement of the valve 7. The non-counterweighted arm of the lever 45 is shown furnished with an antifriction-roll 53, which at the commencement of operation is at the point on said cam-face illustrated in Fig. 3, and as the scale-beam B descends the counterweighted arm of the lever 45 will move simultaneously therewith and the roll 53 be caused to travel along the working face 50' of the cam 50, which action will swing said cam to what is herein illustrated as the "right," and synchronously therewith will draw the rod 46 downward and close the valve 7. The cam-face 50' will be of such form as to permit the exertion of a relatively slow valve-closing force, the face 50'' being of such curvature as will permit an instantaneous closure of the valve 7 and the cut-off of the supply stream as soon as the roll 53 leaves the said cam-face 50' and engages the connected cam-face 50''.

It will be remembered that the rod 46 has been described as consisting of two parts connected by the casing 48. Said casing may have a removable face-plate, as 48', suitably held in place. A by-pass device is shown at 55, it serving as a suitable valve-intercepter, and its supporting-shaft is preferably journaled in the front and back plates, respectively, of said casing 48, said supporting-shaft being furnished with the downward extension 56, fixed thereto and adapted normally to bear against a detent device, the by-pass being preferably counterweighted for this purpose, so that when such relation occurs the by-pass 55 will be positively held against movement in one direction, it constituting in effect a fixed abutment.

An arresting device or by-pass controller is shown at 57 in the form of a reciprocating rod located for movement within the tubular portion 47 of the rod 46 and the casing 48, said rod having an inclined shoulder 58, for a purpose hereinafter specified, and its movement being suitably limited.

Figure 5:
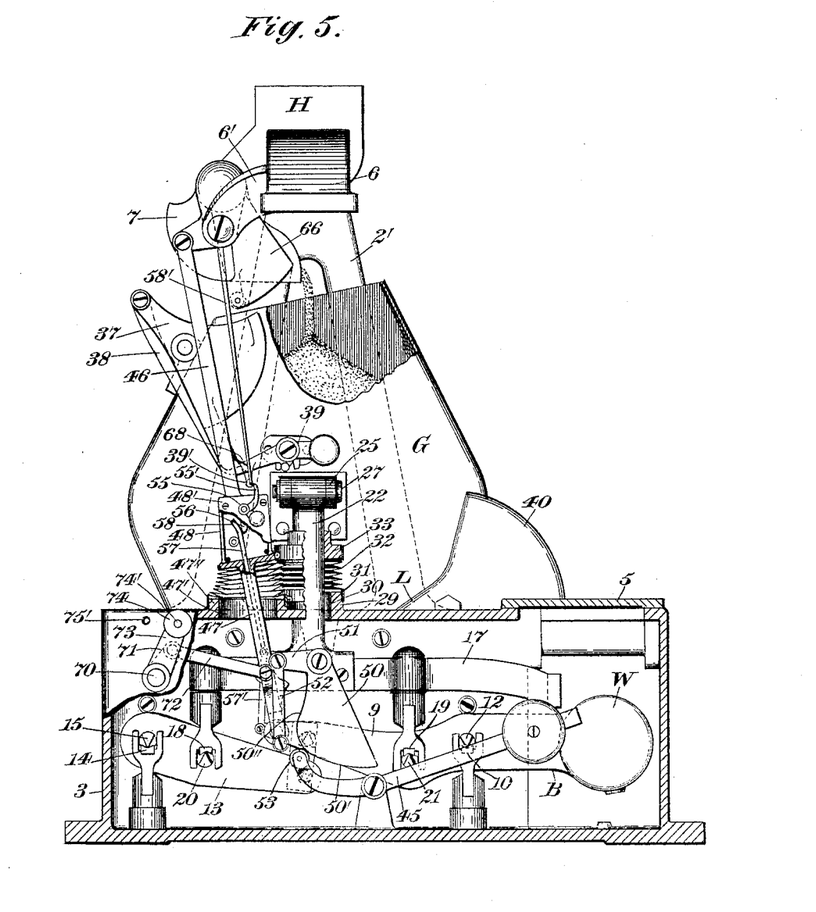
Figs. 5 and 6 are views similar to Fig. 3, and show the machine at two successive points in its operation.

The extension 56 of the by-pass device 55 is adapted normally to bear against the straight portion of the rod 57. The arm 55' of the by-pass is disposed in the arc of movement of and is adapted to engage at a predetermined point in the closing movement or oscillation of the valve 7, the depending rod 58′, connected to said valve, so that when such action takes place, as illustrated in Fig. 5, said valve may be held against further closing movement by the by-pass 55 to permit the flow of a drip or reduced stream into the bucket.

The rod 57 is operatively connected with the scale-beam B or the projection 49 thereof by the link 57′. When the by-pass is held against movement in the manner previously described, and when it also holds the rod, and hence the valve, it will be evident that the scale-beam B is slowly descending, which action draws the rod 57 downward until the inclined shoulder 58 is opposite the lower end of the extension 56 of the by-pass, so that said by-pass may be instantly oscillated about its pivot by the force of the closing valve, as indicated in Fig. 10, and so that the stream from the chute H may be cut off by said valve. On the return stroke of the depending rod 58 it impinges against the upper arm 55′ of the by-pass, thereby swinging the latter ineffectively about its axis, so that said valve may thereby resume its open position. The inner face of the tubular portion 47 of the thrust-rod 46 is shown furnished with bosses 60, (see dotted lines, Figs. 8 and 9,) which serve as a guide for the rod 57, whereby it will be maintained in a true path throughout its movement.

A circular flange is shown at 47″ extending about the opening 47′ in the base of the machine. The lower plate 48$^\times$ of the casing 48 is also illustrated circular, it being connected with the flange 47″ by means of the dust-guard 61, composed of an extensible envelop or bellows, the opposite ends of the latter being held in place by the split annular bands or rings 62 and 63, respectively, of resilient material, the meeting edges of which are provided with ears or offsets 62′ and 63′, respectively, through which may be passed suitable set-screws, as 64 and 65, by which said rings and bellows may be held firmly in place, being, as will be readily obvious, removable, so that said bellows may also be removed. It will be apparent also that the guard or envelop 61 is also laterally movable.

In connection with a valve and with a closer reciprocally effective stop devices are employed, the rocker 37, operatively connected to the closer L, constituting one of said stop devices, and the segmental blade 66, operative with the valve 7, serving as a coacting member.

It will be remembered that a latch 39 has been described as operative for holding the closer L against movement by engaging the rocker 37, said latch being also depressible for releasing said closer. For thus operating the latch the rod 46 is furnished with an extension 68, which is thrust into engagement with the pin 39′ of the latch 39 during the final closing or cut-off movement of the valve 7, so that the latch may be tripped by the power of said valve.

It is desirable at intervals to make tests to ascertain if the machine is weighing accurately, and for this purpose the following instrumentalities are herein illustrated: A relatively short rock-shaft is shown at 70, having a rock-arm 71 connected by a link 72 to the rod 46 or the tubular section 47 thereof. The outer end of the rock-shaft 70 has attached thereto the crank or handle 73, provided with a thumb-piece 74, which may be furnished with a spring or other pin, as 74′, which may be thrust in either of the openings or apertures 75 or 75′, formed in the outer face of the base-plate 4. Said spring-pin will be normally seated in the recess 75, as indicated in Figs. 3 and 5, so that the projection 68 of the rod 46 may have a movement into engagement with the latch-pin 39′, the link 72 serving as a guide for said rod.

When it is desired to make a test, the thumb-piece 74 is grasped and the spring-pin 74′ therein withdrawn from the recess 75 and the crank-arm 73 swung to what is herein illustrated as the "left," the rod 46 being moved in a coinciding direction by virtue of its connections with said rock-arm 71, the projection 68 being also moved from its normal plane of action, so that on its descent it will not engage the latch-pin 39′. The spring-pin in the thumb-piece 74 will then be thrust in the aperture 75′, and if an accurate load be in the bucket this will assume a true poised position.

The operation of the hereinbefore-described weighing-machine is as follows: Fig. 3 represents the positions occupied by the respective operative parts at the commencement of operation, the closer L being locked in its shut position by the latch 39, which engages the rocker 37 or a detent thereon, and the valve 7 being open to permit the flow of the supply stream from the chute or hopper H into the empty bucket. When a certain proportion of the load has been received by the bucket, this and the beam mechanism will descend, the beam-arm 9, falling from under the rod 46, permitting a closing movement of the valve 7 by the counterweighted lever 45, the roll 53 of which rides along the face 50′ of the cam 50, this action drawing the rod 46 downward through its connection with said cam 50, thereby closing the valve 7. At the commencement of the drip period the depending rod 58′ will be engaged by the by-pass device 55 and momentarily held against movement with its connected valve 7 to permit the flow of the drip-stream into the bucket for the purpose of completing the partial load therein. The rod 57 will then be drawn downward by the beam B in descending until the inclined portion 58 thereof is opposite the by-pass projection 56, when said by-pass may be swung about its pivot by the rod 58′, and the valve 7 thereby released to permit it to be instantly closed for cutting off the drip stream. During this last-mentioned movement the projection 68 of the rod 46 is forced into engagement with the latch-pin 39′, depressing the same and releasing the closer L with its supplemental closer 36, so that said closer L may be instantaneously forced open for discharging the bucket load.

Having described my invention, I claim—

1. The combination with a valve, of a rod operatively connected thereto; and a pair of actuators, each effective for transmitting a valve-operating thrust to said rod.

2. The combination with a shiftable bucket-discharge member, of means embodying a latch for normally holding the same against movement; a valve having a rod operatively connected thereto, said rod being provided with a device for tripping said latch; and a pair of actuators, each effective for transmitting a valve-operating thrust to said rod.

3. The combination with a bucket, of a closer therefor; means embodying a latch for normally holding the same against movement; a valve having a rod operatively connected thereto, said rod being provided with a device for tripping said latch; and a pair of actuators, each effective for transmitting a valve-operating thrust to said rod.

4. The combination with a valve, of a rod operatively connected thereto; a bucket and a supporting scale-beam, the latter being in position for transmitting the thrust in one direction to said rod; a counterweighted lever in position for imparting an opposite thrust to said rod; and devices intermediate said lever and rod.

5. The combination with a shiftable bucket-discharge member, of means embodying a latch for normally holding the same against movement; a valve having a rod operatively connected thereto, said rod being provided with a device for tripping said latch; a pair of actuators, each effective for transmitting a valve-operating thrust to said rod; and shifting means operatively connected to said rod.

6. The combination with weighing mechanism embodying a rod a section of which is tubular, of a valve; a rod operative with said valve; a device supported on said first-mentioned rod for intercepting the valve-operative rod at a predetermined point; and means located within said tubular section for controlling said intercepting device.

7. The combination with weighing mechanism embodying a rod a section of which is tubular, of a valve; a rod operative with said valve; a by-pass device supported on said first-mentioned rod and adapted for intercepting the valve-operative rod at a predetermined point in the closing movement of the valve; and means located within said tubular section for controlling said by-pass device.

8. The combination with a valve, of a rod having a tubular section; an actuator for said rod; a valve-intercepter; and a controller for said intercepter operatively connected with said actuator.

9. The combination with a valve, of a rod connected thereto and having a tubular section; a device for intercepting said valve at a predetermined point in its closing movement; and a reciprocating controller for said device, said controller being located within the tubular portion of said rod.

10. The combination with a valve, of a rod operatively connected thereto and having a tubular section; a scale-beam adapted to engage said rod; a valve-intercepter supported on said rod; and means for controlling the action of said intercepter, said means being located within the tubular section of said rod and operatively connected with said scale-beam.

11. The combination with weighing mechanism, of a valve; a rod operatively connected to said valve and having a casing; a by-pass-valve-intercepting device supported by said casing; and means operative with the weighing mechanism for controlling the action of said by-pass device.

12. The combination with weighing mechanism, of a valve; a rod operatively connected thereto, said rod embodying a casing; a by-pass-valve-intercepting device supported by said casing and having a projection; and a shouldered rod located within said casing for controlling the action of said by-pass device, said shouldered rod being governed by the weighing mechanism.

13. The combination with a valve, of a rod operatively connected thereto; a scale-beam operative for engaging said rod; a cam connected to said rod by a link; and a counterweighted lever for actuating said cam.

14. The combination with a valve, of a rod operatively connected thereto and having a tubular section; a pair of actuators, each effective for transmitting a valve-operative thrust to said rod; a valve-intercepter supported by said rod; and means located within the tubular section of the rod for controlling the action of said valve-intercepter.

15. The combination with a chambered supporting-base, of a valve; a rod operatively connected to said valve and extended through an opening in said base; an actuator located within said base and operable for transmitting a valve-operating thrust to said rod; and an extensible guard connected to said rod and base.

16. The combination with a chambered supporting-base, of a valve; a rod operatively connected to said valve and extended through an opening in said base; an actuator located within said base and operable for transmitting a valve-operating thrust to said rod; and an extensible and laterally-movable guard connected to said rod and base.

17. The combination with a chambered supporting-base and beam mechanism located within the same, of a frame sustained by the beam mechanism and having risers passing through the base between which the bucket is mounted; means for supplying a stream of material to said bucket; a stream-controlling valve having a depending rod pivoted thereto and extending through an opening in said base, said rod being in operative relation with the beam mechanism; a cam situated in said base and operatively connected with said rod; a counterweighted lever also located within said base and adapted to actuate said cam and thereby the rod and valve; and extensible envelops or guards disposed about said rod and risers and connected, respectively, thereto and to the base.

18. The combination with a chambered supporting-base, of a scale-beam supported for movement within said base and carrying a yoke; hangers mounted on said yoke and passing through openings formed in said base; a bucket sustained by said hangers; and extensible guards extending about said hangers and connected to said base.

19. The combination with a chambered supporting-base, of a scale-beam supported for movement within said base and carrying a yoke; hangers mounted on said yoke and passing through openings formed in said base; a bucket sustained by said hangers; and adjustable guards extending about said hangers and connected to said base.

20. The combination with a valve, of a rod operatively connected thereto, said rod having a tubular section; a valve-intercepter supported by said rod; and means located within said tubular section for controlling the action of said intercepter.

21. The combination with a chambered supporting-base and beam mechanism located within the same, of framing mounted on said base and carrying a supply-chute; a bucket supported by the beam mechanism and having a closer; means including a latch for holding said closer against movement; a stream-controlling valve for said supply-chute, having a depending rod pivoted thereto and extending into said base, said rod being in operative relation with the beam mechanism and provided also with a latch-tripper; a cam situated in said base and operatively connected to said rod; a counterweighted lever adapted to actuate said cam and thereby the rod and valve; an extensible and laterally-movable envelop or guard disposed about said rod and connected thereto and to the base; and a rock-shaft supported by a wall of said base, one of its ends being connected by a crank and link to said rod, the other end being furnished with an actuating handle or crank.

22. The combination with a chambered dust-proof casing having an opening therein, of weighing mechanism supported within said casing; a valve having a rod connected thereto and extended through an opening formed in said base, said rod being in operative connection with said weighing mechanism; and an actuator for said rod.

23. The combination with a chambered dust-proof casing having an opening and embodying also a removable plate or plates, of a valve having a rod connected thereto and extending through said opening; and a pair of alternately-acting actuators in operative connection with said rod.

24. The combination with a chambered dust-proof casing, of weighing mechanism supported therein; a thrust-rod passing through an opening formed in said casing and in operative connection with said weighing mechanism; and a dust-proof guard extending about said rod at its point of entrance to said casing and connected, respectively, thereto and to said base.

25. The combination with a chambered dust-proof casing, of weighing mechanism supported therein; a valve having a rod connected thereto and passing through an opening formed in said casing and in operative connection with said weighing mechanism; and a laterally-movable extensible envelop disposed about said rod approximately at its point of entrance to said casing and connected, respectively, thereto and to said base.

26. The combination with a chambered supporting-base, of a scale-beam supported for movement within said base and having hangers connected thereto, said hangers passing through openings formed in said base; a bucket supported for movement between said hangers; a valve; a rod passing through an opening formed in said base and operatively connected to said valve and positioned for receiving a thrust from said scale-beam; a cam located within said base and connected to said rod by a link; and a counterweighted lever for engaging said cam.

27. The combination with a chambered dust-proof supporting-base, of a scale-beam supported for movement within said base; a bucket carried by said beam; a closer for said bucket; closer-holding means embodying a latch normally operative for maintaining said closer in its shut position; a valve having a rod operatively connected thereto and in operative connection with said scale-beam, said rod having a latch-tripper; and means for throwing said latch-tripper into an inoperative position.

FRANCIS H. RICHARDS.

Witnesses:
FRED. J. DOLE,
HEATH SUTHERLAND.